United States Patent
Choi (10) Patent No.: US 12,285,993 B2
(45) Date of Patent: Apr. 29, 2025

(54) BREAK MODE CONTROL METHOD OF A DRIVER IN ECO-FRIENDLY VEHICLES AND VEHICLE SYSTEM PROVIDING THE SAME

(71) Applicants: Hyundai Motor Company, Seoul (KR); Kia Corporation, Seoul (KR)

(72) Inventor: Jaehyeok Choi, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 294 days.

(21) Appl. No.: 17/724,856

(22) Filed: Apr. 20, 2022

(65) Prior Publication Data
US 2023/0030978 A1   Feb. 2, 2023

(30) Foreign Application Priority Data
Jul. 27, 2021 (KR) .......................... 10-2021-0098571

(51) Int. Cl.
*B60H 1/00* (2006.01)
*B60K 15/03* (2006.01)
(Continued)

(52) U.S. Cl.
CPC .......... *B60H 1/00778* (2013.01); *B60L 15/20* (2013.01); *B60Q 9/00* (2013.01);
(Continued)

(58) Field of Classification Search
CPC ............ B60H 1/00778; B60H 1/00378; B60H 1/00657; B60H 1/008; B60L 15/20;
(Continued)

(56) References Cited

U.S. PATENT DOCUMENTS

2018/0154793 A1* 6/2018 Jun ..................... B60H 1/00778
2021/0331706 A1* 10/2021 Kim ....................... B60K 35/80

FOREIGN PATENT DOCUMENTS

CN    109591548 A  *  4/2019  ............. B60H 1/008
JP    2005027476 A  *  1/2005

OTHER PUBLICATIONS

Kia EV Niro Owner's Manual, 2020 (Year: 2020).*
English translation of Xu et al. (CN-109591548) (Year: 2019).*
English translation of Tatsuno (JP-2005027476) (Year: 2005).*

* cited by examiner

*Primary Examiner* — James M McPherson
*Assistant Examiner* — Kyle J Kingsland
(74) *Attorney, Agent, or Firm* — Morgan, Lewis & Bockius LLP (57) ABSTRACT

A vehicle system is directed to providing a driver with a utility mode, which is an indoor environment condition of a vehicle where it may be rested, and includes: a vehicle communication portion that is configured to receive a first request message requesting execution of the utility mode by communicating with a service terminal provided in the vehicle or a driver terminal possessed by the driver; and a vehicle controller that is configured to set electric components and controllers involved in driving of the vehicle to an off mode when an entry condition for the execution of the utility mode is satisfied and the vehicle's starting is in an on-state, and sets an air conditioning device controlling an indoor air condition of the vehicle and a stack generating power required in the utility mode to a driving mode to execute the utility mode.

18 Claims, 5 Drawing Sheets

(51) Int. Cl.
*B60L 15/20* (2006.01)
*B60Q 9/00* (2006.01)

(52) U.S. Cl.
CPC .... *B60K 15/03* (2013.01); *B60K 2015/03315* (2013.01); *B60L 2240/12* (2013.01); *B60L 2240/30* (2013.01); *B60L 2240/34* (2013.01); *B60L 2240/48* (2013.01); *B60L 2240/70* (2013.01); *B60L 2260/26* (2013.01)

(58) Field of Classification Search
CPC ............. B60L 2240/12; B60L 2240/30; B60L 2240/34; B60L 2240/48; B60L 2240/70; B60L 2260/26; B60L 1/003; B60L 1/02; B60L 58/12; B60L 58/40; B60L 1/08; B60Q 9/00; B60K 15/03; B60K 2015/03315; B60W 50/10; B60W 50/082; B60W 30/18054; B60W 2510/101
See application file for complete search history.

FIG. 4

BREAK MODE CONTROL METHOD OF A DRIVER IN ECO-FRIENDLY VEHICLES AND VEHICLE SYSTEM PROVIDING THE SAME

CROSS-REFERENCE TO RELATED APPLICATION

The present application claims priority to Korean Patent Application No. 10-2021-0098571 filed on Jul. 27, 2021, the entire contents of which is incorporated herein for all purposes by this reference.

BACKGROUND OF THE PRESENT DISCLOSURE

Field of the Present Disclosure

The present disclosure relates to a break mode control method of a driver in an environment-friendly vehicle such as an electric vehicle (EV) or fuel cell electric vehicle (FCEV), for controlling a vehicle system to enable the driver to take a break in a comfortable state in the environment-friendly vehicle when the vehicle is stopped for a long time, and a vehicle system providing the method.

Description of Related Art

In the case of large trucks, it is necessary to stop for at least 30 minutes to 3 hours for loading and unloading cargo. Furthermore, in Europe, it is mandatory for drivers who transport passengers/cargo to take a break of at least 45 minutes after 4.5 hours of driving. Conventionally, for long breaks, drivers often used rest areas provided with various resting facilities.

However, recently, due to the COVID-19 outbreak, drivers are reluctant to use public areas such as rest areas. Furthermore, the number of drivers who want to take a break in the interior of the vehicle, which is a personal space, is increasing.

Meanwhile, for the driver to take a long rest indoors, it is necessary to use various electric devices such as air conditioner, heater, lighting, and the like. However, when starting of the vehicle is maintained in an ON state for the use of an electric device, various electronic components related to the vehicle's driving are in an idle state, generating vibration and noise. Furthermore, although the vehicle is in a stopped state, there is a problem in that energy is wasted to maintain various electric and electronic components related to driving of the vehicle in the idle state. Therefore, in the case of a conventional internal combustion engine vehicle, a method of using a mounted parking air conditioner and a mounted parking heater is used.

However, in the case of a vehicle that utilizes a battery, such as a fuel cell electric vehicle (FCEV), when the air conditioner, heater, and air conditioning device are continuously operated in the starting OFF state (i.e., parking state), there is a risk of the battery being discharged. Furthermore, when the air conditioner, heater, air conditioning device, and the like are operated in the starting ON state, there is a problem of interfering with the driver's rest due to vibration and noise caused by the operation of various electronic components unrelated to the driver's rest and energy wasting.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driver with a break mode control method in an environment-friendly vehicle that can reduce noise and vibration (NVH: Noise, Vibration, Harshness) and prevent unnecessary waste of energy while the driver rests comfortably in the interior of the environment-friendly vehicle, and a vehicle system that provides that method.

A vehicle system according to various aspects of the present disclosure are directed to providing a driver with a utility mode, which is an indoor environment condition of a vehicle where it may be rested, and includes: a vehicle communication portion that is configured to receive a first request message requesting execution of the utility mode by communicating with a service terminal provided in the vehicle or a driver terminal possessed by the driver; and a vehicle controller that is configured to set electric components and controllers involved in driving of the vehicle to an off mode when an entry condition for the execution of the utility mode is satisfied and the vehicle's starting is in an on-state, and sets an air conditioning device controlling an indoor air condition of the vehicle and a stack generating power required in the utility mode to a driving mode to execute the utility mode.

The entry condition may include a first execution condition in which the stack is in a drivable state, a second execution condition in which an amount of residual hydrogen in a hydrogen storage tank is equal to or greater than a predetermined reference value, a third execution condition in which the vehicle is in a stationary state, a fourth execution condition in which a shifting gear of the vehicle is in a neutral state, and a fifth execution condition in which a parking brake of the vehicle is engaged.

The normal state may be a state in which all conditions required for the stack for the vehicle to travel are satisfied and a preset defect does not occur.

The electric component may include a driving motor involved in driving the vehicle and a steering motor involved in changing a driving direction of the vehicle, and the controller may include at least one of a controller of the driving motor, a controller of the steering motor, and an advanced driver assistance system (ADAS).

The vehicle controller may be configured to control the air conditioning device to maintain an indoor temperature and indoor humidity in a predetermined state.

The vehicle controller may be configured to control a window of the vehicle to be opened when an indoor carbon dioxide concentration of the vehicle is greater than or equal to a level of reference concentration.

When receiving a second request message that requests execution of a safety mode from the service terminal or the driver terminal through the vehicle communication portion, the vehicle controller may detect an object approaching within an area around the vehicle based on information collected by an object recognition device provided in the vehicle, and transmit a notification message instructing the approaching of the object to at least one of the service terminal and the driver terminal through the vehicle communication portion The object recognition device may include at least one of a camera mounted on the vehicle, a proximity sensor sensing whether the object approaches or not, and a surround view monitor (SVM).

The vehicle controller may include a first release condition in which the vehicle controller receives a termination message requesting termination of the utility mode from the driver terminal or the service terminal, a second release condition in which the vehicle's starting is turned off, a third release condition in which an amount of residual hydrogen in a hydrogen storage tank is less than a predetermined reference value, a fourth release condition in which the vehicle is in an operating state, a fifth release condition in which a shifting gear of the vehicle is in a non-neutral state, or a sixth release condition in which a parking brake of the vehicle is released, and may convert the electric components and the controllers of the electric components to a driving mode from an off mode to terminate the utility mode.

When the third release condition is satisfied, the vehicle controller may transmit a notification message indicating that the remaining amount of the hydrogen in the hydrogen storage tank is less than the predetermined reference value to the driver terminal or the service terminal.

A break mode control method according to various aspects of the present disclosure are directed to providing a driver with a utility mode, which is an indoor environment condition of a vehicle, in which the driver can take a break. The break mode control method includes: receiving a first request message that requests execution of the utility mode by communicating with a server terminal provided in the vehicle or a driver terminal possessed by the driver; determining whether an entry condition for execution of the utility mode is satisfied or not; and when the vehicle controller concludes that the entry condition is satisfied and the vehicle's starting is in an on-state, setting electric components and controllers involved in driving of the vehicle to an off mode, and setting an air conditioning device controlling an indoor air condition of the vehicle and a stack generating power required in the utility mode to a driving mode to execute the utility mode.

The entry condition may include a first execution condition in which the stack is in a drivable state, a second execution condition in which an amount of residual hydrogen in a hydrogen storage tank is equal to or greater than a predetermined reference value, a third execution condition in which the vehicle is in a stationary state, a fourth execution condition in which a shifting gear of the vehicle is in a neutral state, and a fifth execution condition in which a parking brake of the vehicle is engaged.

The normal state may be a state in which all conditions required for the stack for the vehicle to travel are satisfied and a preset defect does not occur.

The electric component may include a driving motor involved in driving the vehicle and a steering motor involved in changing a driving direction of the vehicle. The controller may include at least one of controller of the driving motor, a controller of the steering motor, and an advanced driver assistance system (ADAS).

The execution of the utility mode may control a window of the vehicle to be opened when an indoor carbon dioxide concentration of the vehicle is greater than or equal to a level of reference concentration.

The execution of the utility mode may control a window of the vehicle to be opened when an indoor carbon dioxide concentration of the vehicle is greater than or equal to a level of reference concentration.

The break mode control method may further include, after the execution of the utility mode, when a second request message that requests execution of a safety mode from the service terminal or the driver terminal through the vehicle communication portion is received, detecting an object approaching within an area around the vehicle based on information collected by an object recognition device provided in the vehicle, and transmitting a notification message instructing the approaching of the object to at least one of the service terminal and the driver terminal through the vehicle communication portion to execute the safety mode.

The object recognition device may include at least one of a camera mounted on the vehicle, a proximity sensor sensing whether the object approaches or not, and a surround view monitor (SVM).

The break mode control method may further include, after the execution of the safety mode, determining whether a termination condition is satisfied or not, the termination condition including a first release condition in which it receives a termination message requesting termination of the utility mode from the driver terminal or the service terminal, a second release condition in which the vehicle's starting is turned off, a third release condition in which an amount of residual hydrogen in a hydrogen storage tank is less than a predetermined reference value, a fourth release condition in which the vehicle is in an operating state, a fifth release condition in which a shifting gear of the vehicle is in a non-neutral state, or a sixth release condition in which a parking brake of the vehicle is released; and when the vehicle controller concludes that the termination condition is satisfied, converting the electric components and the controllers of the electric components to a driving mode from an off mode to terminate the utility mode.

The termination of the utility mode may include when the third release condition is satisfied, transmitting a notification message indicating that the remaining amount of the hydrogen in the hydrogen storage tank is less than the predetermined reference value to the driver terminal or the service terminal.

According to an exemplary embodiment of the present disclosure, various electronic components related to vehicle driving are converted from an idle state to an OFF state in the starting is ON, noise and vibration (NVH: Noise, Vibration, Harshness) may be reduced and energy may be saved.

Various aspects of the present disclosure are directed to providing a rest mode to the driver when the starting is ON, the demand for additional purchases of devices such as an air conditioner and a heater may be eliminated, reducing costs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, referring to the drawings, an exemplary embodiment included in the exemplary embodiment will be described in detail, but the same or similar constituent elements are provided the same and similar reference numerals, and overlapping descriptions thereof will be omitted. The suffixes "module" and/or "portion" for the constituent elements used in the following description are provided or mixed in consideration of only the ease of specification writing, and do not have distinct meanings or roles by themselves. Furthermore, in description of the exemplary embodiment included in the exemplary embodiment, when it is determined that a detailed description of a related known technology may obscure the gist of the exemplary embodiment included in the exemplary embodiment, the detailed description is omitted. Furthermore, the appended drawings are only for easy understanding of the exemplary embodiment included in the exemplary embodiment, and the technical idea included in the exemplary embodiment of the present disclosure is not limited by the appended drawings, and all changes included in the spirit and technical range of the present disclosure may be understood to include equivalents or substitutes.

Terms including ordinal numbers such as first, second, and the like may be used to describe various constituent elements, but the constituent elements are not limited by the terms. The terms are used only for distinguishing one constituent element from another constituent element.

When it is mentioned that a certain constituent element is "connected to" or "linked to" another constituent element, it may be directly connected or linked to the other constituent element, but it is understood that another constituent element may exist in between. On the other hand, when it is mentioned that a certain constituent element is "directly connected to" or "directly linked to" another constituent element, it should be understood that another constituent element does not exist in between.

In the present application, terms such as "comprise" or "have" are intended to designate that a feature, number, step, operation, constituent element, part, or combination thereof described in the specification exists, and it should be understood as not precluding the possibility of the presence or addition of any one or more other features, numbers, steps, actions, constituent elements, parts, or combinations thereof.

Figure 1:
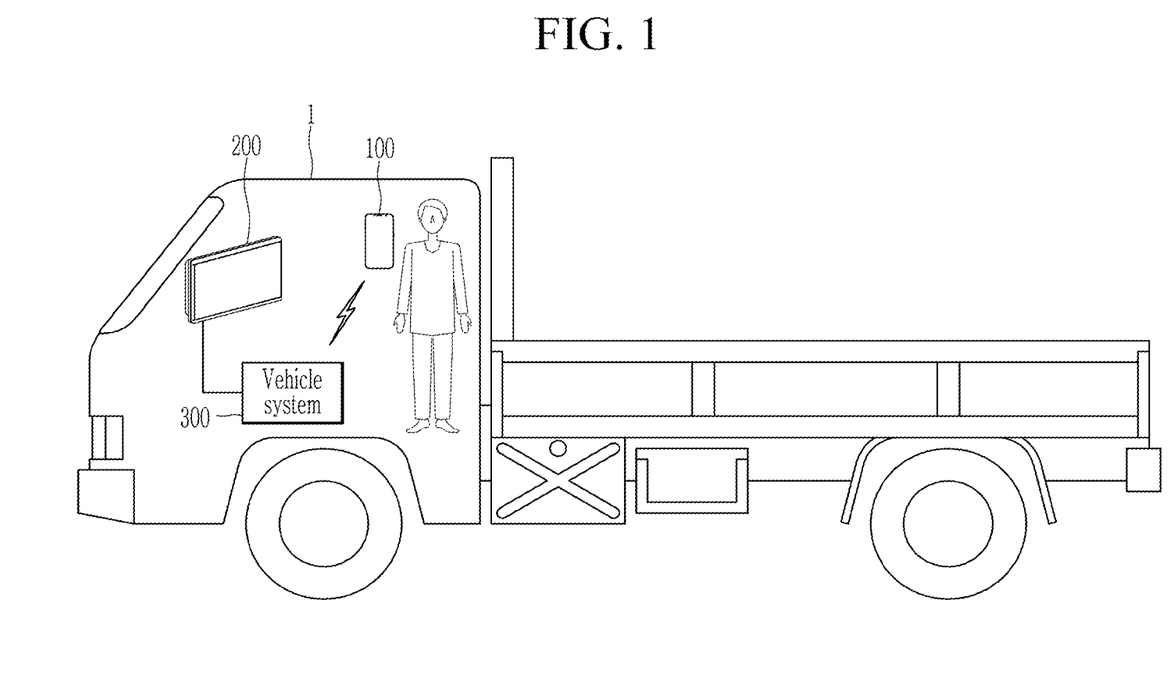
FIG. 1 is provided for description of a break mode control system.
Figure 2:
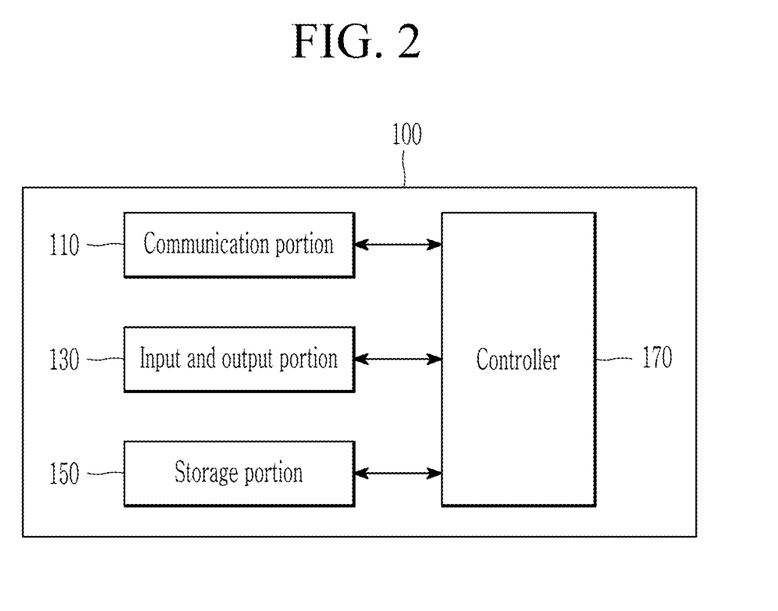
FIG. 2 is a block diagram for detailed description of a function with respect to a driver's terminal of FIG. 1.
Figure 3:
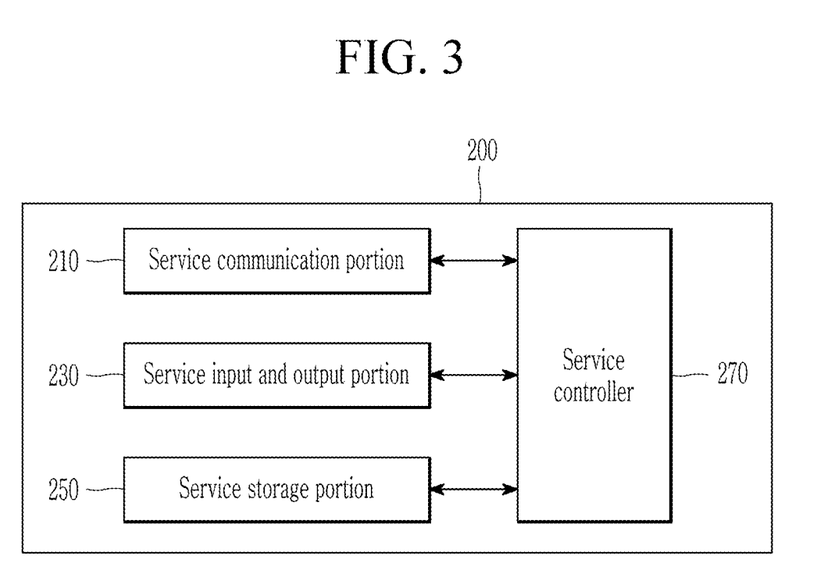
FIG. 3 is a block diagram for detailed description of a function of a service terminal of FIG. 1.
Figure 4:
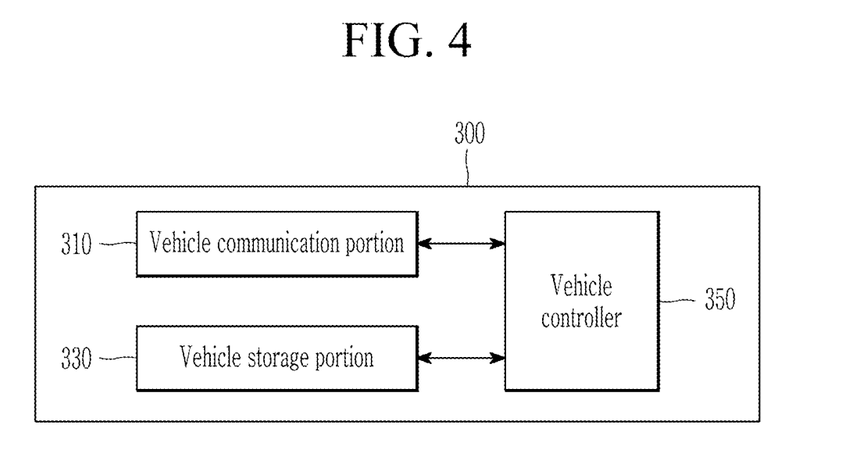
FIG. 4 is a block diagram for detailed description of a function with respect to a vehicle system of FIG. 1.

FIG. 1 is provided for description of a break mode control system, FIG. 2 is a block diagram for detailed description of a function with respect to a driver's terminal of FIG. 1, FIG. 3 is a block diagram for detailed description of a function of a service terminal of FIG. 1, and FIG. 4 is a block diagram for detailed description of a function with respect to a vehicle system of FIG. 1.

Referring to FIG. 1, a break mode control system includes a driver terminal 100, a service terminal 200, and a vehicle system 300.

The break mode control system may provide a driver with a utility mode and a safety mode so that the driver can rest for a long time in the interior of a stopped vehicle. The utility mode is a mode that maintains the vehicle's indoor environment in a comfortable state so that the driver can rest comfortably. For example, in the utility mode, noise, vibration, and harshness (NVH) that are generated due to various electronic devices of the vehicle may be reduced. Furthermore, in the utility mode, an indoor temperature, humidity, and carbon dioxide concentration of the vehicle may be maintained in a predetermined state. For another example, in the safety mode, an alarm may be generated so that the driver can recognize an outsider or an object entering the vehicle.

According to the exemplary embodiment of the present disclosure, when the driver wants to take a break for a long time inside the stopped vehicle, the driver may transmit a first request message for requesting entry into the utility mode and a second request message requesting entry into the safety mode to the vehicle system 300 through the driver terminal 100 possessed by the driver. In the instant case, the vehicle system 300 may transmit various notification messages generated in each of the utility mode and the safety mode, a status message indicating status information, and the like to the driver terminal 100.

According to another exemplary embodiment of the present disclosure, the driver may transmit a first request message requesting entry of the utility mode and a second request message requesting entry of the safety mode to the vehicle system 300 through the service terminal 200. In the instant case, the vehicle system 300 may transmit various alarm messages generated in each of the utility mode and the safety mode, and state messages that indicates state information to the service terminal 200.

The driver terminal 100 may be a terminal possessed by a driver in a vehicle. For example, it may be a terminal possessed by a vehicle driver.

Referring to FIG. 2, the driver terminal 100 includes a communication portion 110, an input and output portion 130, a storage portion 150, and a controller 170.

The communication portion 110 is connected to a communication network, and may transmit and receive data with the vehicle system 300. The communication portion 110 may be connected to a communication network through a wireless communication protocol, but this is not restrictive. For example, the communication portion 110 may be connected to a communication network through a conventional communication protocol or a communication protocol which will be developed according to the development of a future technology.

The input and output portion 130 displays various pieces of information required for the utility mode and the safety mode, and receives various inputs of the driver. The input and output portion 130 may receive an input instructing a request from a driver by displaying an interface for each application of the utility mode and the safety mode. Furthermore, the input and output portion 130 may display various information related to temperature, humidity, carbon dioxide concentration, and the like controlled in the utility mode and the safety mode.

The input and output portion 130 may include display means, for example, a liquid crystal display (LCD) panel, a light emitting diode (LED) panel, an organic light emitting diode (OLED) panel, an active-matrix organic light-emitting diode (AMOLED) panel, and the like for displaying the above-stated information.

The input and output portion 130 may include, for example, a touch input means such as a keypad, a push button, a membrane button, and the like to receive information as an input from the driver, and may be implemented as a touch screen through which input and output both may be conducted.

The storage portion 150 may store data, an algorithm, and the like for operation of the driver terminal 100. Depending on embodiments, the storage portion 150 may store applications (hereinafter referred to as an app.) that can remotely execute and control the utility mode and the safety mode.

The controller 170 controls the driver terminal 100 as a whole, and communicates with the vehicle system 300 through the communication portion 110 to execute the utility mode and the safety mode. For example, when receiving an input for application of each of the utility mode and the safety mode through the input and output portion 130, the controller 170 may transmit a first request message and a second request message to the vehicle system 300 through the communication portion 110.

The service terminal 200 may be a terminal provided inside the vehicle. For example, the service terminal 200 may be a cluster terminal where an Audio, Video, and Navigation (AVN), an In-Vehicle Infotainment (IVI) system, and the like are provided. In the instant case, the IVI is a phrase combining information and entertainment, and is a mobility service that provides information delivery and entertainment simultaneously.

Referring to FIG. 3, the service terminal 200 includes a service communication portion 210, a service input and output portion 230, a service storage portion 250, and a service controller 270.

The service communication portion 210 may include a controller area network (CAN) communication module that enables communication between electronic components within the vehicle, and may transmit/receive data to or from the vehicle system 300. However, the service communication portion 210 is not limited to the CAN communication module, and may be connected to the vehicle system 300 through an in-vehicle communication protocol, which will be described according to development of a future technology.

The service input and output portion 230 displays various information necessary for the utility mode and the safety mode, and receives various inputs of the driver. The service input and output portion 230 may receive an input instructing a request from a driver by displaying an interface for each application of the utility mode and the safety mode. Furthermore, the service input and output portion 230 may display various information related to temperature, humidity, carbon dioxide concentration, and the like controlled in the utility mode and the safety mode.

The service input and output portion 230 may include a display means such as an LCD panel, a light-emitting diode (LED) panel, an Organic Light-Emitting Diode (OLED) panel, and the like. The service input and output portion 230 may include, for example, a touch input means such as a keypad, a push button, a membrane button, and the like to receive information as an input from the driver, and may be implemented as a touch screen through which input and output both may be conducted.

The service storage portion 250 may store data, an algorithm, and the like for operation of the driver terminal 100. Depending on embodiments, the service terminal 200 may store applications (hereinafter referred to as an app.) that can remotely execute and control the utility mode and the safety mode.

The service controller 270 controls the service terminal 200 as a whole, and communicates with the vehicle system 300 through the service communication portion 210 to execute the utility mode and the safety mode. For example, when receiving an input for application of each of the utility mode and the safety mode through the service input and output portion 230, the service controller 270 may transmit a first request message and a second request message to the vehicle system 300 through the service communication portion 210.

The vehicle system 300 may control various electric components in the vehicle to control a driving mode in which the vehicle is operating and a stopping mode in which the vehicle is stopped for a predetermined time period. According to the exemplary embodiment of the present disclosure, the vehicle system 300 may execute the utility mode and the safety mode according to a driver's request in the stop mode.

Referring to FIG. 4, the vehicle system 300 includes a vehicle communication portion 310, a vehicle storage portion 330, and a vehicle controller 350.

The vehicle communication portion 310 may transmit/receive data to or from the driver terminal 100 including a wireless communication module for communicating with the driver terminal 100 through a communication network. Furthermore, the vehicle communication portion 310 includes a CAN communication module and thus may transmit and receive data to or from the service terminal 200.

The vehicle storage portion 330 may store various data, an algorithm, and the like for execution of the utility mode and the safety mode. Furthermore, the vehicle storage portion 330 may store information transmitted and received with each of the driver terminal 100 and the service terminal 200. Furthermore, the vehicle storage portion 330 may store information (temperature, humidity, carbon dioxide concentration, and the like) collected by various electronic devices inside the vehicle and state information of each storage device.

The vehicle controller 350 may integrate and control various electronic devices in the vehicle. In accordance with embodiments, the vehicle controller 350 may determine whether the entry condition and the release condition are satisfied in the utility mode. Furthermore, the vehicle controller 350 may transmit various indoor environment information (temperature, humidity, carbon dioxide concentration, and the like) to the driver terminal 100 and the service terminal 200 through the vehicle communication portion 310 while the utility mode and the safety mode are being executed.

Hereinafter, referring to FIG. 1 to FIG. 5, a break mode control method of controlling an environment-friendly driver and a vehicle system that provides the method will be described in detail.

Figure 5:
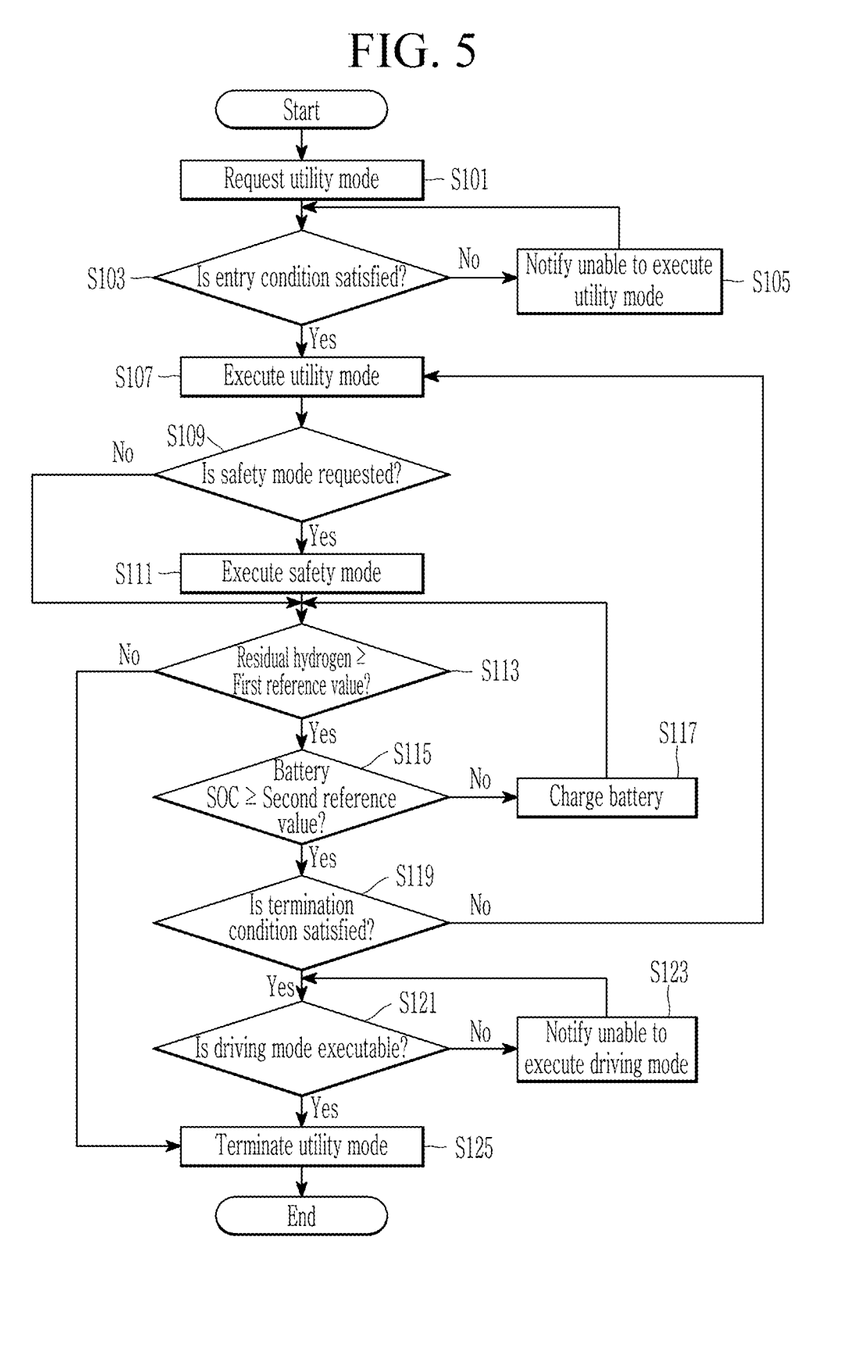
FIG. 5 is a flowchart for description of a break mode control method of a driver in a fuel cell electric vehicle (FCEV) according to an exemplary embodiment of the present disclosure.

FIG. 5 is a flowchart for description of a break mode control method of controlling a driver in a fuel cell electric vehicle (FCEV) according to an exemplary embodiment of the present disclosure.

Referring to FIG. 5, the vehicle communication portion 310 communicates with the service terminal 200 or the driver terminal 100, and receives a first request message requesting entry into the utility mode (S101).

In accordance with embodiments, the vehicle may include a fuel cell electric vehicle (FCEV). For example, the vehicle may be a fuel cell electric truck. The utility mode may refer to a utility mode executed in the fuel cell electric truck.

The fuel cell electric truck may store the energy generated by hydrogen in a high voltage battery pack and drive a motor with power discharged from the high voltage battery pack. For example, the fuel cell electric truck may include a hydrogen storage tank that stores hydrogen, a stack that combines hydrogen and oxygen in air to produce electrical energy, and stores the electrical energy produced in the stack, a high voltage battery pack, and a low voltage auxiliary battery for supplying power required for various electronic components. In the instant case, the stack may include a plurality of fuel cells connected in series. The high voltage battery pack may supply power to the motor. The low voltage battery converts high voltage power of the battery pack into low voltage power (e.g., 12 V) to supply power to various electronic components operating in the utility mode.

However, without being limited thereto, the fuel cell electric truck may include a low voltage auxiliary battery (e.g., output of 12 V) that supplies power to the hydrogen storage tank, stack, and various electronic components. In the instant case, the fuel cell electric truck may drive a motor with the power generated by the stack.

Next, the vehicle controller 350 determines whether the entry condition for entering the utility mode is satisfied (S103).

The entry condition may include a first execution condition in which a stack including a plurality of fuel cells is drivable, a second execution condition in which the amount of residual hydrogen in the hydrogen storage tank is equal to or greater than the first reference value, a third execution condition in which a vehicle in a stationary state, a fourth execution condition in which a shifting gear of the vehicle is in a neutral state, and a fifth execution condition in which a parking brake of the vehicle is engaged.

The state in which the stack is drivable may be a steady state to allow the stack to produce the electrical energy required when the vehicle is running. For example, the steady state may be a state in which all conditions required for the stack for the vehicle to travel are satisfied, and a preset (defined) defect does not occur. The first reference value may correspond to the minimum amount of hydrogen remaining required for the vehicle to run. For example, the utility mode may be run in a range that does not affect the driving of the vehicle. The stopped state may indicate that the speed of the vehicle is 0 kilometer per hour (kph). That is, the stopped state may be a state in which the vehicle does not move. For example, when the vehicle speed is 1 kph, it may not be in a stopped state. The neutral state of the gear may be a state that includes both the neutral gear (N stage) and the parking gear (P stage) of a general passenger vehicle. For example, the fuel cell electric truck may not be disposed with the parking gear P used by the general passenger vehicles.

Next, when the entry condition is not satisfied (S103, No), the vehicle controller 350 transmits a notification message indicating that the utility mode cannot be entered to the driver terminal 100 or the service terminal 200 through the vehicle communication portion 310 (S105).

The vehicle controller 350 may determine that it is impossible to enter the utility mode when at least one of the first execution condition to the fifth execution condition is not satisfied. The vehicle controller 350 may determine that it is possible to enter the utility mode when all of the first execution condition to the fifth execution condition are satisfied.

For example, when the driver transmits the first request message to the vehicle system 300 through the driver terminal 100, the vehicle controller 350 transmits the notification message indicating that the utility mode cannot be entered to the driver terminal 100 through the vehicle communication portion 310. For another example, when the driver transmits the first request message to the vehicle system 300 through the service terminal 200, the vehicle controller 350 may transmit the notification message indicating that the utility mode cannot be entered to the service terminal 200 through the vehicle communication portion 310.

Next, when the entry condition is satisfied (S103, Yes), the vehicle controller 350 executes the utility mode in the ON state of the vehicle starting (S107).

According to the exemplary embodiment of the present disclosure, to enter the utility mode, the vehicle controller 350 may switch the electric components involved in the driving of the vehicle from the break mode to the off mode.

For example, in the case of a large truck, the driving motor may be in the break mode that operates at a minimum revolutions per minute (rpm) (e.g., 1 rpm or more) to maintain the pressure of the shifting oil even while stopped. Furthermore, in the case of a heavy truck, the steering motor may be in the break mode that operates at a minimum rpm (e.g., 1 rpm or more) to maintain oil pressure even while stopped. Furthermore, in the case of a heavy truck, a controller of the driving motor (MCU), a controller (MCU) of the steering motor, an airbag control controller (MCU), an advanced driver assistance systems (ADAS), and the like may also be in an ON state.

When the driving motor and the steering motor are in the break mode when the vehicle is stopped, vibration and noise are generated, which may make the driver in the vehicle feel uncomfortable, and there is a problem in that energy is wasted. In accordance with embodiments, the vehicle controller 350 sets the off mode to stop (e.g., 0 rpm) the operation of the driving motor and the steering motor in the utility mode, reducing the generation of vibration and noise, and saving energy. Furthermore, the vehicle controller 350 sets not only the driving motor controller and the steering motor controller, but also the airbag control controller and the advanced driver assistance system (ADAS), which control unnecessary operations when the vehicle is stopped, to the off mode to save energy.

In accordance with embodiments, to enter the utility mode, the vehicle controller 350 may set the vehicle's air conditioning device and stack to a driving mode. In the instant case, the air conditioning device may refer to a device configured for maintaining and managing an indoor temperature, indoor humidity, and cleanliness of air of a vehicle.

For example, when the operation of the air conditioning device and stack is in the off mode, the vehicle controller 350 sets the air conditioning device and stack in the off mode in the driving mode to enter the utility mode. As an exemplary embodiment of the present disclosure, when the air conditioner and stack are already in the driving mode, the driving mode may be maintained.

In the utility mode, the vehicle controller 350 may control the air conditioning device so that each of the vehicle's indoor temperature and indoor humidity are maintained in a predetermined state. For example, the vehicle's indoor temperature and indoor humidity may be automatically assigned to predetermined values or changed by a driver. Furthermore, in the utility mode, the vehicle controller 350 may control a window and thus the vehicle window is opened when the indoor carbon dioxide concentration of the vehicle is greater than or equal to a level of a reference concentration. The vehicle controller 350 may receive an indoor carbon dioxide concentration value of the vehicle from a sensor measuring carbon dioxide concentration at a predetermined time period through the vehicle communication portion 310.

Next, the vehicle controller 350 determines whether a second request message requesting execution of the safety mode from the driver terminal 100 or the service terminal 200 is received through the vehicle communication portion 310 (S109).

Next, as a determination result, when the second request message is not received (S109, No), the vehicle controller 350 executes only the utility mode without executing the safety mode.

Next, as a determination result, when the second request message is received (S109, Yes), the vehicle controller 350 additionally executes the safety mode in the execution step of the utility mode (S111).

In the safety mode, the vehicle controller 350 detects an object approaching within the area around the vehicle based on information collected by an object recognition device. In the instant case, the object recognition device may include at least one of a camera mounted on a vehicle, a proximity sensor sensing an object approaching within a predetermined distance, and a surround view monitor (SVM). The vehicle controller 350 may transmit a notification message instructing the approaching of the object to at least one of the driver terminal 100 and the service terminal 200 through the vehicle communication portion 310.

Next, the vehicle controller 350 determines whether the amount of residual hydrogen in the hydrogen storage tank is greater than or equal to a first reference value (S113).

Next, when it is determined that the amount of residual hydrogen in hydrogen storage tank is less than the first reference value (S113, No), the vehicle controller 350 executes terminating the utility mode (S125), which will be described below.

Next, when it is determined that the amount of residual hydrogen in hydrogen storage tank is greater than or equal to the first reference value (S113, Yes), the vehicle controller 350 determines whether a state of charge (SOC) value of a high-voltage battery pack is greater than or equal to the second reference value (S115).

The second reference value may correspond to an SOC sufficient to supply power to electronic components in the utility mode and the safety mode. In the instant case, the electric components may include electronic components driven in the utility mode and the safety mode, but may not include electronic components involved in driving.

For example, when the SOC value of a low voltage battery that supplies power to an electronic component is insufficient, the low voltage battery may be charged with the power of a high voltage battery pack. Therefore, the SOC value of the high voltage battery pack needs to be maintained above the second reference value.

Next, when it is determined that the SOC is less than the second reference value (S115, No), the vehicle controller 350 may drive the stack to charge the high voltage battery pack (S117). For example, the vehicle controller 350 may charge the high voltage battery pack until the SOC value of the high voltage battery pack is equal to or greater than the second reference value.

Next, the vehicle controller 350 determines whether the termination condition for terminating the utility mode is satisfied (S119).

The termination condition may include a first release condition in which it receives a termination message requesting the termination of the utility mode from the driver terminal 100 or the service terminal 200, a second release condition in which the vehicle's starting is turned off, a third release condition in which an amount of residual hydrogen in the hydrogen storage tank is less than the first reference value, a fourth release condition in which the vehicle is in an operating state, a fifth release condition in which the vehicle's gear is in a non-neutral state, or a sixth release condition in which the vehicle's parking brake is released.

The operating state may indicate that the speed of the vehicle is 1 kilometer per hour (KPH) or more. That is, the operating state may be a state in which the vehicle is moving. When the vehicle's gear is in a non-neutral state, a state in which the gear is not in a neutral state may be included. For example, the non-neutral state of the vehicle's gear may include a gear in a drive state (D stage) or a reverse state (R stage).

Next, when the termination condition is not satisfied (S119, No), the vehicle controller 350 maintains the utility mode (S107).

For example, the vehicle controller 350 may determine that it is impossible to release the utility mode when not all of the first release condition to the fifth release condition are satisfied. For another example, when at least one of the first release condition to the fifth release condition is satisfied, the vehicle controller 350 may determine that the utility mode may be released.

Next, when the termination condition is satisfied (S119, Yes) but the operation mode of the vehicle is not executable (S121, No), the vehicle controller 350 may transmit a notification message that includes execution of the operation mode cannot be conducted to at least one of the driver terminal 100 and the service terminal 200 (S123).

For example, the vehicle controller 350 may determine whether the operation mode is executable by satisfying a predetermined condition of the vehicle system 300 and the external environment of the vehicle. When it is determined that external environments of the vehicle system 300 and the vehicle are not good (S121, No), the vehicle controller 350 may transmit a notification message indicating a defect in the external environment of the vehicle system 300 and the vehicle to at least one of the driver terminal 100 and the service terminal 200 (S123).

For another example, the vehicle controller 350 may determine whether a smart key of the vehicle exists in the interior of the vehicle. When it is determined that the vehicle's smart key does not exist inside the vehicle (S121, No), the vehicle controller 350 transmits a notification message indicating that the smart key does not exist inside the vehicle to at least one of the driver terminal 100 and the service terminal 200 (S123).

Next, when the termination condition is satisfied (S119, Yes) and the operation mode is executable (S121, Yes), the vehicle controller 350 terminates the utility mode (S125).

When the utility mode is released based on the third release condition, the vehicle controller 350 may transmit a notification message indicating that the remaining amount of hydrogen in the hydrogen storage tank is less than the first reference value to the driver terminal 100 or the service terminal 200.

When terminating the utility mode, the vehicle controller 350 may switch the electric components involved in the driving of the vehicle from the off mode to the driving mode. Furthermore, when the utility mode is not released according to the sixth release condition and the parking brake of the vehicle is engaged, the vehicle controller 350 may release the engagement of the parking brake.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle system that provides a driver with a utility mode, which is an indoor environmental condition of a vehicle in which the driver can take a break, the vehicle system comprising:
   a vehicle communication portion that is configured to receive a first request message requesting execution of the utility mode by communicating with a service terminal provided in the vehicle or a driver terminal possessed by the driver; and
   a vehicle controller that is configured to set electric components and controllers involved in driving of the vehicle to an off mode when all of first, second, third, fourth and fifth execution conditions of an entry condition for the execution of the utility mode are satisfied and the vehicle's starting is in an on-state, and configured to set an air conditioning device controlling an indoor air condition of the vehicle and a stack generating power required in the utility mode to a driving mode to execute the utility mode,
   wherein the first execution condition is that the stack is in a drivable state, the second execution condition is that an amount of residual hydrogen in a hydrogen storage tank is equal to or greater than a predetermined reference value, the third execution condition is that the vehicle is in a stationary state, the fourth execution condition is that a shifting gear of the vehicle is in a neutral state, and the fifth execution condition is that a parking brake of the vehicle is engaged.

2. The vehicle system of claim 1, wherein the drivable state is a state in which all conditions required for the stack for the vehicle to travel are satisfied and a preset defect does not occur.

3. The vehicle system of claim 1,
   wherein the electric components include a driving motor involved in driving the vehicle and a steering motor involved in changing a driving direction of the vehicle, and wherein the vehicle controller includes at least one of a controller of the driving motor, a controller of the steering motor, and an advanced driver assistance system (ADAS).

4. The vehicle system of claim 1, wherein the vehicle controller is configured to control the air conditioning device to maintain an indoor temperature and indoor humidity in a predetermined state.

5. The vehicle system of claim 1, wherein the vehicle controller is configured to control a window of the vehicle to be opened when an indoor carbon dioxide concentration of the vehicle is greater than or equal to a level of reference concentration.

6. The vehicle system of claim 1, wherein
when receiving a second request message that requests execution of a safety mode from the service terminal or the driver terminal through the vehicle communication portion,
the vehicle controller is configured to detect an object approaching within an area around the vehicle based on information collected by an object recognition device provided in the vehicle, and to transmit a notification message instructing the approaching of the object to at least one of the service terminal and the driver terminal through the vehicle communication portion.

7. The vehicle system of claim 6, wherein the object recognition device includes at least one of a camera mounted on the vehicle, a proximity sensor sensing whether the object approaches or not, and a surround view monitor (SVM).

8. The vehicle system of claim 1,
wherein the vehicle controller includes a first release condition in which the vehicle controller receives a termination message requesting termination of the utility mode from the driver terminal or the service terminal, a second release condition in which the vehicle's starting is turned off, a third release condition in which the amount of the residual hydrogen in the hydrogen storage tank is less than the predetermined reference value, a fourth release condition in which the vehicle is in an operating state, a fifth release condition in which the shifting gear of the vehicle is in a non-neutral state, or a sixth release condition in which the parking brake of the vehicle is released, and
wherein the vehicle controller is configured to convert the electric components and the controllers of the electric components to a driving mode from an off mode to terminate the utility mode.

9. The vehicle system of claim 8, wherein when the third release condition is satisfied, the vehicle controller is configured to transmit a notification message indicating that the remaining amount of the hydrogen in the hydrogen storage tank is less than the predetermined reference value to the driver terminal or the service terminal.

10. A break mode control method for providing a driver with a utility mode, which is an indoor environment condition of a vehicle, in which the driver can take a break, the break mode control method comprising:
receiving, by a vehicle controller, a first request message that requests execution of the utility mode by communicating with a server terminal provided in the vehicle or a driver terminal possessed by the driver;
determining, by the vehicle controller, whether an entry condition for execution of the utility mode is satisfied or not; and
when the vehicle controller concludes that all of first, second, third, fourth and fifth execution conditions of the entry condition are satisfied and the vehicle's starting is in an on-state, setting, by the vehicle controller, electric components and controllers involved in driving of the vehicle to an off mode, and setting, by the vehicle controller, an air conditioning device controlling an indoor air condition of the vehicle and a stack generating power required in the utility mode to a driving mode to execute the utility mode,
wherein the first execution condition is that the stack is in a drivable state, the second execution condition is that an amount of residual hydrogen in a hydrogen storage tank is equal to or greater than a predetermined reference value, the third execution condition is that the vehicle is in a stationary state, the fourth execution condition is that a shifting gear of the vehicle is in a neutral state, and the fifth execution condition is that a parking brake of the vehicle is engaged.

11. The break mode control method of claim 10, wherein the drivable state is a state in which all conditions required for the stack for the vehicle to travel are satisfied and a preset defect does not occur.

12. The break mode control method of claim 10,
wherein the electric components include a driving motor involved in driving the vehicle and a steering motor involved in changing a driving direction of the vehicle, and
wherein the vehicle controller includes at least one of a controller of the driving motor, a controller of the steering motor, and an advanced driver assistance system (ADAS).

13. The break mode control method of claim 10, wherein the execution of the utility mode controls the air conditioning device to maintain an indoor temperature and indoor humidity in a predetermined state.

14. The break mode control method of claim 10, wherein the execution of the utility mode controls a window of the vehicle to be opened when an indoor carbon dioxide concentration of the vehicle is greater than or equal to a level of reference concentration.

15. The break mode control method of claim 10, further including,
after the execution of the utility mode, when a second request message that requests execution of a safety mode from the service terminal or the driver terminal through a vehicle communication portion is received,
detecting, by the vehicle controller, an object approaching within an area around the vehicle based on information collected by an object recognition device provided in the vehicle, and transmitting, by the vehicle controller, a notification message instructing the approaching of the object to at least one of the service terminal and the driver terminal through the vehicle communication portion to execute the safety mode.

16. The break mode control method of claim 15, wherein the object recognition device includes at least one of a camera mounted on the vehicle, a proximity sensor sensing whether the object approaches or not, and a surround view monitor (SVM).

17. The break mode control method of claim 15, further including:
after the execution of the safety mode,
determining, by the vehicle controller, whether a termination condition is satisfied or not, the termination condition including a first release condition in which the vehicle controller receives a termination message requesting termination of the utility mode from the driver terminal or the service terminal, a second release condition in which the vehicle's starting is turned off, a third release condition in which the amount of the residual hydrogen in the hydrogen storage tank is less than the predetermined reference value, a fourth release condition in which the vehicle is in an operating state, a fifth release condition in which the shifting gear of the vehicle is in a non-neutral state, or a sixth release condition in which the parking brake of the vehicle is released; and when the vehicle controller concludes that the termination condition is satisfied, converting, by the vehicle controller, the electric components and the controllers of the electric components to a driving mode from an off mode to terminate the utility mode.

18. The break mode control method of claim 15, wherein the termination of the utility mode includes, when the third release condition is satisfied, transmitting, by the vehicle controller, a notification message indicating that the remaining amount of the hydrogen in the hydrogen storage tank is less than the predetermined reference value to the driver terminal or the service terminal.

* * * * *